US009170595B2

(12) United States Patent
Lahiri

(10) Patent No.: US 9,170,595 B2
(45) Date of Patent: Oct. 27, 2015

(54) LOW POWER REFERENCE GENERATOR CIRCUIT

(71) Applicant: STMicroelectronics International N.V., Amsterdam (NL)

(72) Inventor: Abhirup Lahiri, Delhi (IN)

(73) Assignee: STMicroelectronics International N.V., Amsterdam (NL)

( * ) Notice: Subject to any disclaimer, the term of this patent is extended or adjusted under 35 U.S.C. 154(b) by 464 days.

(21) Appl. No.: 13/650,829

(22) Filed: Oct. 12, 2012

(65) Prior Publication Data

US 2014/0103900 A1 Apr. 17, 2014

(51) Int. Cl.
*H02M 3/02* (2006.01)
*G05F 3/24* (2006.01)

(52) U.S. Cl.
CPC .. *G05F 3/24* (2013.01); *G05F 3/245* (2013.01)

(58) Field of Classification Search
CPC .............................................. G05F 3/24–3/262
USPC .................................................. 323/312–316
See application file for complete search history.

(56) References Cited

U.S. PATENT DOCUMENTS 6,285,244 B1 * 9/2001 Goldberg ...................... 327/539
6,831,504 B1 * 12/2004 Holloway et al. ............. 327/541
6,914,831 B2 7/2005 Di Iorio
7,969,236 B1 * 6/2011 Hyde et al. .................... 327/538
7,978,005 B1 * 7/2011 Hyde et al. .................... 327/538
8,188,785 B2 5/2012 Iacob et al.
2002/0014883 A1 * 2/2002 Sirito-Olivier ................ 323/315
2005/0046469 A1 3/2005 Geissler
2007/0241809 A1 10/2007 Kothandaraman et al.
2008/0129272 A1 * 6/2008 Kimura ......................... 323/315

OTHER PUBLICATIONS

Tzanateas, G., et al: "A CMOS Bandgap Voltage Reference," IEEE Journal fo Solid-State Circuits, vol. SC-14, No. 3, Jun. 1979, pp. 655-657.

* cited by examiner

*Primary Examiner* — Jessica Han
(74) *Attorney, Agent, or Firm* — Gardere Wynne Sewell LLP

(57) ABSTRACT

A PTAT circuit includes a first, second, third, and fourth transistors plus a resistor. The first and second transistors have control terminals coupled to each other. The third and fourth transistors have control terminals coupled to each other. The third transistor sources a first current to the first transistor and the fourth transistor sources a second current to the second transistor. The resistor is coupled at a node to the second transistor. A current source circuit sources additional current into the node that is derived from the first and second currents. In one implementation, the additional current is a scaled mirror of the second current. In another implementation, the additional current is a scaled mirror of the sum of the first and second currents. An output current is obtained by mirroring one of the first-third currents. A band-gap output voltage is obtained by applying the additional current across a resistance.

29 Claims, 4 Drawing Sheets

LOW POWER REFERENCE GENERATOR CIRCUIT

TECHNICAL FIELD

The present invention relates to reference generator circuits and, in particular, to reference generator circuits suitable for use in low power (low current) applications.

BACKGROUND

Ultra-low current and/or voltage references are required in most low power circuit applications. Examples of such applications include circuits which are powered by a battery and are always on.

The area of an integrated circuit which is occupied by an ultra-low current and/or voltage generator is typically dominated by the presence of a large resistor, not the presence of the included transistors. In this regard, those skilled in the art understand that to reduce the current consumption of the generator by one-half, the size of the included resistor needs to be increased by two times. Thus, there is a known trade-off between power/current and occupied area.

A figure of merit (FOM) is known which can be used to compare current/voltage generators: FOM=TCC*A*M; where TCC is the total current consumption, A is the area of the generator circuit, and M is the Monte-Carlo mismatch of the generator circuit. It is desired to minimize the FOM. In this regard, the circuit designer desires for a same mismatch and area to reduce the current consumption, or for a same mismatch and current consumption to reduce the area. One known solution for reducing the area creates the large resistor by using a switched capacitor resistor circuit with an external clock reference. Another solution for creating a large resistor is use a MOSFET device operating in the triode region. Reference is made to U.S. Patent Application Publication No. 2007/0241809 (the disclosure of which is incorporated by reference). The foregoing solutions are not, however, satisfactory.

SUMMARY

In an embodiment, a reference generator circuit comprises: a PTAT circuit including a first transistor coupled in series with a first resistive element at a first node, said first transistor configured to pass a first current to said first node; and a current source configured to source a second current (for example, an up-scaled version of the first current) said first node; wherein the resistive element passes a third current equal to a sum of the first and second currents.

In an embodiment, a reference generator circuit comprises: a PTAT circuit including a first transistor, a second transistor, and a first resistive element, wherein the first and second transistors have control terminals coupled to each other, the first resistive element having a first end coupled to a conduction terminal of the second transistor and a second end coupled to a reference supply node; and a current source circuit configured to source additional current (for example, an up-scaled mirror current) into the first end of the first resistive element.

BRIEF DESCRIPTION OF THE DRAWINGS

For a better understanding of the embodiments, reference will now be made by way of example only to the accompanying figures in which.

DETAILED DESCRIPTION OF THE DRAWINGS

Figure 1:
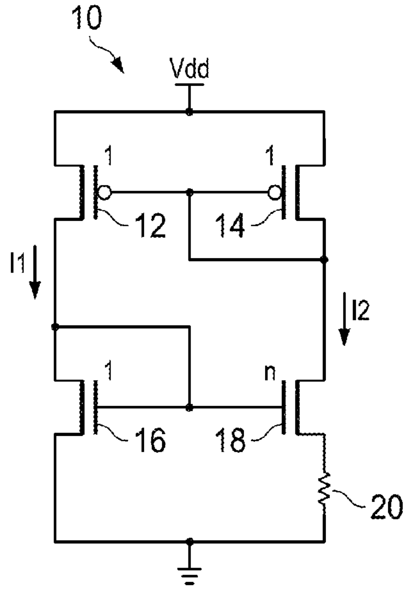
FIG. 1 is a circuit diagram of a prior art PTAT current generator.

Reference is now made to FIG. 1 which is a circuit diagram of a prior art PTAT current generator 10. The circuit comprises two PMOS transistors 12 and 14 arranged in a current mirror configuration to deliver two currents I1 and I2 to two NMOS transistors 16 and 18. The two PMOS transistors have their control (gate) terminals coupled together and further coupled to the conduction (drain) terminal of PMOS transistor 14. The conduction (source) terminals of the two PMOS transistors 12 and 14 are coupled to a high reference supply node (for example, Vdd). The current mirror formed by this arrangement of PMOS transistors 12 and 14 ensures that the current I1 equals the current I2 (provided PMOS transistors 12 and 14 are similarly sized with a ratioing of 1:1). The two NMOS transistors 16 and 18 have their control (gate) terminals coupled together and further coupled to the conduction (drain) terminal of NMOS transistor 16. The conduction (source) terminal of NMOS transistor 16 is coupled to a low reference supply node (for example, ground), while the conduction (source) terminal of NMOS transistor 18 is coupled to the low reference supply node through a resistor 20 (where, for example, a first end of the resistor is coupled to the transistor source and a second end is coupled to the low reference supply node). The two NMOS transistors 16 and 18 are not similarly sized, and instead exhibit a 1:n ratioing. The two NMOS transistors 16 and 18 are operated in the sub-threshold region. In operation, the threshold voltages of the two NMOS transistors 16 and 18 are temperature dependent (with negative thermal coefficients), but the delta voltage across the resistor 20 is PTAT.

It will be understood that the two NMOS transistors 16 and 18 could instead be implemented with low beta NPN bi-polar transistors (perhaps needing an additional beta compensation circuit known to those skilled in the art).

It will be understood that the two PMOS transistors 12 and 14 could instead be implemented with PNP bi-polar transistors.

Figure 2:
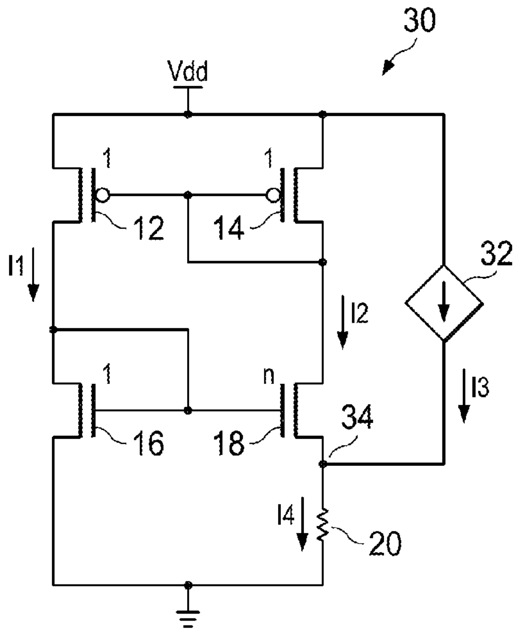
FIG. 2 is a circuit diagram of a PTAT current generator.

Reference is now made to FIG. 2 which is a circuit diagram of a PTAT current generator 30. Like reference numbers refer to like or similar parts. The generator 30 of FIG. 2 differs from the generator 10 of FIG. 1 in the addition of a current source 32 configured to inject a current I3 into node 34 at the source terminal of the NMOS transistor 18. The node 34 functions as a current summing junction to sum the current I2 with the current I3 for application as current I4 across the resistor 20. The current I3 from source 32 is derived from the current I2 (or I1), and in a preferred implementation is a scaled replica having a value of $\alpha I2$ (i.e., $I3=\alpha I2=\alpha I1$). Thus, the current $I4=I2+I3=I2+\alpha I2=I2(1+\alpha)$.

Thus, it will be understood by those skilled in the art that as the value of a increases, power consumption of the generator 30 is reduced. Very large values of a cause the branch (or leg)

currents in the two NMOS transistors 16 and 18 to reduce and may produce an increased mismatch. However, very large values of a are not typically required as the benefit is saturating. A slight increase in mismatch for lower values of a (for example, $\alpha$in the range of 1-4), can be restored by resizing devices with larger area. For example, the transistors for the current mirrors can be designed with larger lengths.

The two NMOS transistors 16 and 18 in generator 30 are operated in the sub-threshold region such that the delta voltage across the resistor 20 equals $\eta V_T \ln(n)$. Thus, the current $I1=I2=\eta V_T \ln(n)/(1+\alpha)R_{20}$. This gives the effect of the resistor 20 being multiplied by a factor of $(1+\alpha)$. The total current consumption for the generator 30 is then $(2+\alpha)I2$. In comparison, the reference current generator 10 in FIG. 1 has a total current consumption of $2\eta V_T \ln(n)/R_{20}$. Thus, the current consumption of generator 30 is $(2+\alpha)/(2^*(1+\alpha))$ times the current consumption of generator 10 and this factor tends to one-half for large values of $\alpha$.

Figure 3:
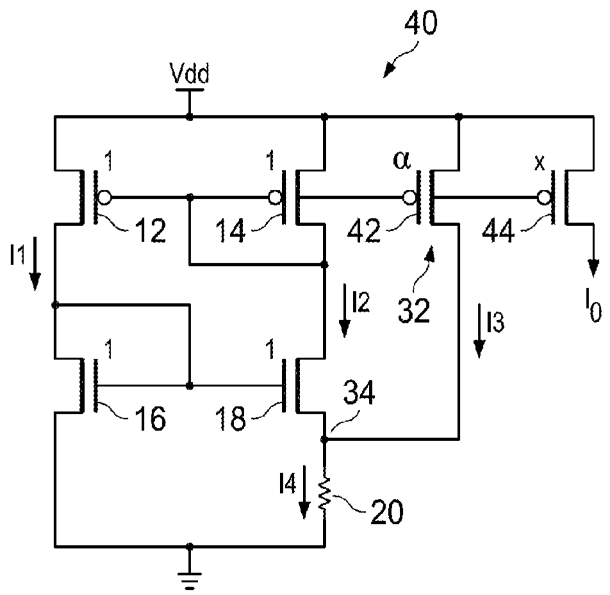
FIG. 3 is a circuit diagram of a PTAT current generator.

Reference is now made to FIG. 3 which is a circuit diagram of a PTAT current generator 40. Like reference numbers refer to like or similar parts. The current source 32 is formed by a PMOS transistor 42 having its source terminal coupled to the high reference supply node and its control terminal (gate) coupled to the control terminals (gates) of the two PMOS transistors 12 and 14. Thus, the PMOS transistor 42 is in a current mirror arrangement with the PMOS transistors 12 and 14. However, the PMOS transistor 42 is not similarly sized to the two PMOS transistors 12 and 14, and instead exhibits a $1:\alpha$ ratioing. With this configuration, the PMOS transistor 42 generates the current I3 at its drain terminal with a value of $\alpha I2$ (i.e., $I3=\alpha I2$). The current I3 is injected into node 34 at the source terminal of the NMOS transistor 18.

For use as a current source, an additional PMOS transistor 44 could be coupled in a current mirror arrangement (with a ratioing of 1:x) with the PMOS transistors 12 and 14 so as to produce at the drain of transistor 44 a reference output current $I_o$. The current $I_o=xI2$. For most low power applications, for example ultra-low power crystal oscillator circuits, this reference output current can be in the order of the current I2, and thus suitable values for x can be small (for example, on the order of <8 to 10). The increase in active area of the generator circuit due to the inclusion of one or more additional transistors 44 is, however, trivial as the total area of the circuit is primarily dominated by the resistor area.

The two NMOS transistors 16 and 18 in generator 40 are operated in the sub-threshold region such that the delta voltage across the resistor 20 equals $\eta V_T \ln(n)$. Thus, the current $I1=I2=\eta V_T \ln(n)/(1+\alpha)R_{20}$. This gives the effect of the resistor 20 being multiplied by a factor of $(1+\alpha)$. The total current consumption for the generator 30 is then $(2+\alpha)I2$. In comparison, the reference current generator 10 in FIG. 1 has a total current consumption of $2\eta V_T \ln(n)/R_{20}$. Thus, the current consumption of generator 40 is $(2+\alpha)/(2^*(1+\alpha))$ times the current consumption of generator 10 and this factor tends to one-half for large values of $\alpha$.

Figure 4:
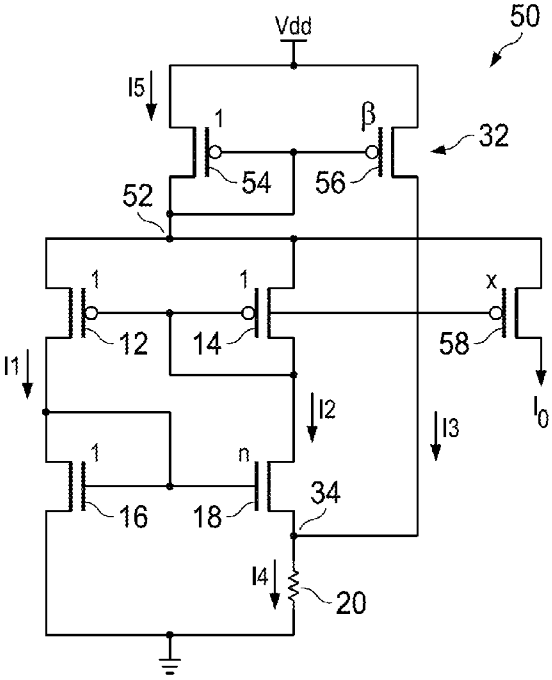
FIG. 4 is a circuit diagram of a PTAT current generator.

Reference is now made to FIG. 4 which is a circuit diagram of a PTAT current generator 50. Like reference numbers refer to like or similar parts. In the generator 50, the source terminals of the two PMOS transistors 12 and 14 are coupled to a common node 52. A PMOS transistor 54 has its source-drain circuit coupled between the high reference supply node (for example, Vdd) and the common node 52. A PMOS transistor 56 is coupled to PMOS transistor 54 in a current mirror configuration. The source terminals of the PMOS transistors 54 and 56 are coupled to the high reference supply node, while the control terminal (gate) of PMOS transistor 54 is coupled to its drain terminal at the common node 52 and to the control terminal (gate) of PMOS transistor 56. The PMOS transistor 54 is a top current source for the PMOS transistors 12 and 14 and sources a current I5 which is equal to the sum of the currents I1 and I2 (i.e., $I5=I1+I2=2^*I2$). The current source 32 is formed by the PMOS transistor 56. The PMOS transistor 56 is not similarly sized to the PMOS transistor 54, and instead exhibits a $1:\beta$ ratioing. With this configuration, the PMOS transistor 56 generates the current I3 at its drain terminal with a value of $2^*\beta I2$ (i.e., $I3=2^*\beta I2$). The current I3 is injected into node 34 at the source terminal of the NMOS transistor 18, resulting in a current $I4=I2+I3=I2+2^*\beta I2=I2(1+2\beta)$. For use as a current source, an additional PMOS transistor 58 could be coupled in a current mirror arrangement (with a ratioing of 1:x) with the PMOS transistors 12 and 14 so as to produce at the drain of transistor 58 a reference output current $I_o$.

Thus, it will be understood by those skilled in the art that as the value of $\beta$ increases, power consumption of the generator 30 is reduced. Furthermore, it is noteworthy that the generator 50 can achieve a reduced power consumption by a same amount as with the generator 40, while using a value of $\beta$ that is less than the value of $\alpha$ (for example, similar performance with $\beta=1$ in generator 50 and $\alpha=2$ in generator 40). This is due to a higher feedback factor. These advantages are achieved at a cost of an increased voltage supply requirement (increased by approximately a p-channel MOS transistor threshold voltage) in generator 50.

The two NMOS transistors 16 and 18 in generator 50 are operated in the sub-threshold region such that the delta voltage across the resistor 20 equals $\eta V_T \ln(n)$. Thus, the current $I1=I2=\eta V_T \ln(n)/(1+2^*\beta)R_{20}$. This gives the effect of the resistor 20 being multiplied by a factor of $(1+2^*\beta)$. The total current consumption for the generator 30 is then $(2+2^*\beta)I2$. In comparison, the reference current generator 10 in FIG. 1 has a total current consumption of $2\eta V_T \ln(n)/R_{20}$. Thus, the current consumption of generator 30 is $(2+2^*\beta)/(2^*(1+2^*\beta))$ times the current consumption of generator 10 and this factor tends to one-half for large values of $\beta$.

Figure 5:
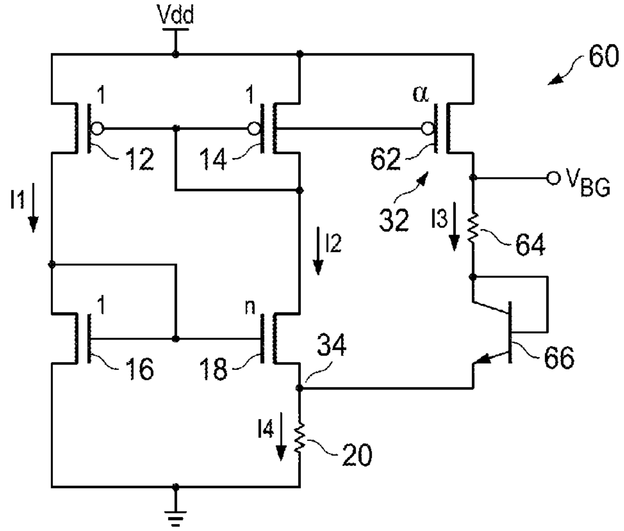
FIG. 5 is a circuit diagram of a band-gap voltage generator.

Reference is now made to FIG. 5 which is a circuit diagram of a band-gap voltage generator 60. Like reference numbers refer to like or similar parts. The current source 32 is formed by a PMOS transistor 62 having its source terminal coupled to the high reference supply node and its control terminal (gate) coupled to the control terminals (gates) of the two PMOS transistors 12 and 14. Thus, the PMOS transistor 62 is in a current mirror arrangement with the PMOS transistors 12 and 14. However, the PMOS transistor 62 is not similarly sized to the two PMOS transistors 12 and 14, and instead exhibits a $1:\alpha$ ratioing. With this configuration, the PMOS transistor 62 generates the current I3 at its drain terminal with a value of $\alpha I2$ (i.e., $I3=\alpha I2$). The current I3 is applied across a resistor 64 and diode connected NPN bi-polar transistor 66 that are coupled in series between the drain terminal of PMOS transistor 62 and summing node 34. Transistor 66 is optional (see, FIG. 7). The current I3 is injected into node 34 at the source terminal of the NMOS transistor 18. The output band-gap voltage $V_{BG}$ is generated at the drain terminal of PMOS transistor 62. This voltage $VBG=\eta V_T \ln(n)\ \alpha\ R_{64}/(1+\alpha)R_{20}+VBE_{66}$. As is well known, the ratio of resistor 64 and resistor 20 is chosen to first-order cancel the temperature variation of the output voltage. The two NMOS transistors 16 and 18 in generator 60 are operated in the sub-threshold region such that the delta voltage across the resistor 20 equals $\eta V_T \ln(n)$. Thus, the current $I1=I2=\eta V_T \ln(n)/(1+\alpha)R_{20}$. The total current consumption for the generator 60 is then $(2+\alpha)I2=(2+\alpha)\eta V_T \ln(n)/(1+\alpha)R_{20}$. In comparison, the band-gap reference voltage generator shown in FIG. 6B has a total current consumption of $3\eta V_T ln(n)/R_{20}$. Thus, the current consumption of generator 60 is $(2+\alpha)/(3*(1+\alpha))$ times the current consumption of generator in FIG. 6B and this factor tends to one-third for large values of $\alpha$.

Figure 6A:
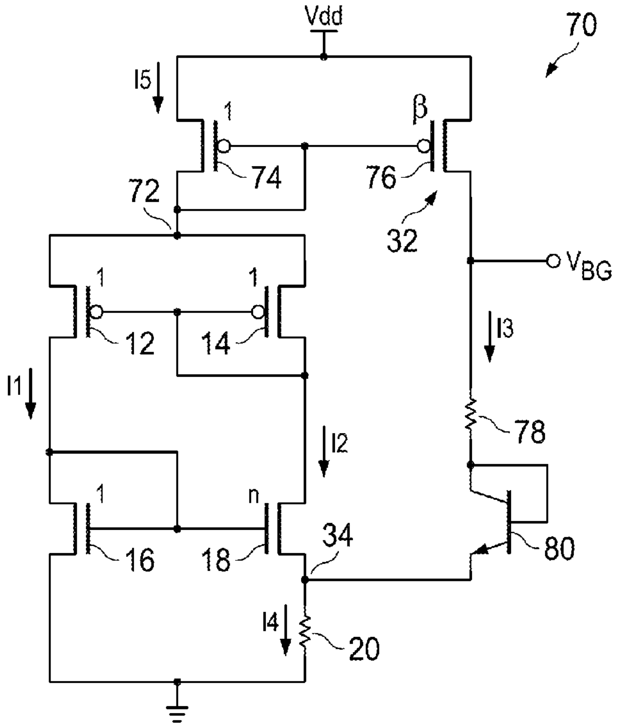
FIGS. 6A is a circuit diagram of a band-gap voltage generator.
Figure 6B:
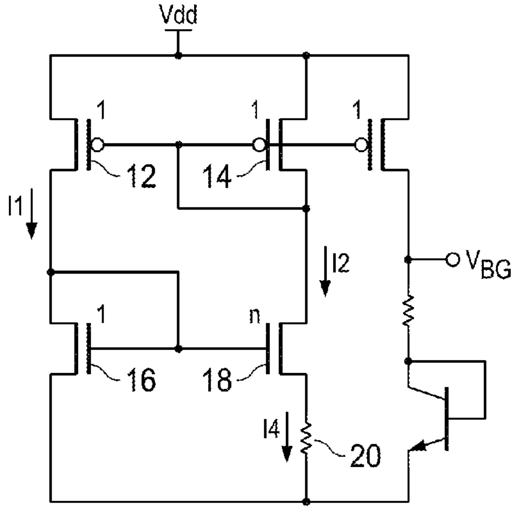
FIG. 6B is a circuit diagram of a prior art band-gap voltage generator.

Reference is now made to FIG. 6A which is a circuit diagram of a band-gap voltage generator 70. Like reference numbers refer to like or similar parts. In the generator 50, the source terminals of the two PMOS transistors 12 and 14 are coupled to a common node 72. A PMOS transistor 74 has its source-drain circuit coupled between the high reference supply node (for example, Vdd) and the common node 72. A PMOS transistor 76 is coupled to PMOS transistor 74 in a current mirror configuration. The source terminals of the PMOS transistors 74 and 76 are coupled to the high reference supply node, while the control terminal (gate) of PMOS transistor 74 is coupled to its drain terminal at the common node 72 and to the control terminal (gate) of the PMOS transistor 76. The PMOS transistor 74 is a tail current source for the PMOS transistors 12 and 14 and sources a current I5 which is equal to the sum of the currents I1 and I2 (i.e., I5=I1+I2=2*I2). The current source 32 is formed by the PMOS transistor 76. The PMOS transistor 76 is not similarly sized to the PMOS transistor 74, and instead exhibits a 1:$\beta$ ratioing. With this configuration, the PMOS transistor 76 generates the current I3 at its drain terminal with a value of 2*$\beta$I2 (i.e., I3=2*$\beta$I2). The current I3 is applied across a resistor 78 and diode connected NPN bi-polar transistor 80 that are coupled in series between the drain terminal of PMOS transistor 76 and summing node 34. Transistor 80 is optional (see, FIG. 7). The current I3 is injected into node 34 at the source terminal of the NMOS transistor 18. The output band-gap voltage $V_{BG}$ is generated at the drain terminal of PMOS transistor 76. This voltage $VBG=\eta V_T ln(n)\ 2\beta\ R_{64}/(1+2\beta)R_{20}+VBE_{66}$. As is well known, the ratio of resistor 64 and resistor 20 is chosen to first-order cancel the temperature variation of the output voltage. The two NMOS transistors 16 and 18 in generator 70 are operated in the sub-threshold region such that the delta voltage across the resistor 20 equals $\eta V_T ln(n)$. Thus, the current $I1=I2=\eta V_T ln(n)/(1+2\beta)R_{20}$. The total current consumption for the generator 70 is then $(2+2\beta I2=(2+2\beta)\eta V_T ln(n)/(1+2\beta)R_{20}$. In comparison, the band-gap reference voltage generator shown in FIG. 6B has a total current consumption of $3\eta V_T ln(n)/R_{20}$. Thus, the current consumption of generator 70 is $(2+2*\beta/(3*(1+2*\beta))$ times the current consumption of generator in FIG. 6B and this factor tends to one-third for large values of $\beta$.

Figure 7:
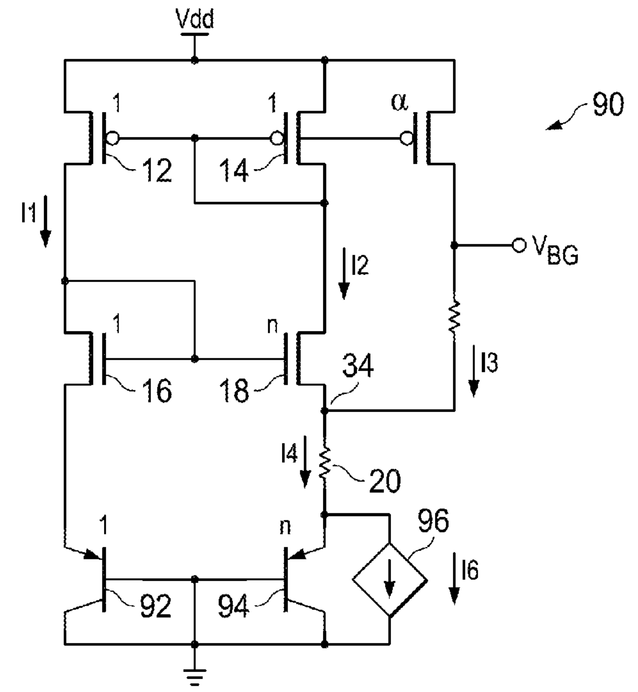
FIG. 7 is a circuit diagram of a band-gap voltage generator.

Reference is now made to FIG. 7 which is a circuit diagram of a band-gap voltage generator 90. Like reference numbers refer to like or similar parts. The generator 90 differs from the generator 60 of FIG. 5 with respect to the circuitry for connecting the source terminals of the two NMOS transistors 16 and 18 to the low reference supply node. A first PNP bi-polar transistor 92 has its emitter-collector circuit path coupled between the conduction (source) terminal of NMOS transistor 16 and the low reference supply node. A second PNP bi-polar transistor 94 has its emitter-collector circuit path coupled in series with the resistor 20 between the conduction (source) terminal of NMOS transistor 18 and the low reference supply node. The control terminals (bases) of the transistors 92 and 94 are coupled together and to the low reference supply node. The transistors 92 and 94 have a ratioing of 1:n. The generator 90 further differs from the generator 60 of FIG. 5 with respect to the ratioing of the two NMOS transistors 16 and 18. In the generator 90, the two NMOS transistors 16 and 18 are similarly sized with a ratioing of 1:1. A current source 96 is coupled in parallel with the second PNP bi-polar transistor 94. The current I6 from source 96 has a value of $\alpha$I2 (i.e., I6=$\alpha$I2). This current could be generated, for example, by a ratioed mirroring of the current I2 using a current mirror circuit coupled to transistors 12 and 14. The output band-gap voltage $V_{BG}$ is generated at the drain terminal of PMOS transistor 62. This voltage is $VBG=V_T ln(n)\ \alpha\ R_{64}/(1+\alpha)R_{20}+VBE_{66}$. As is well known, the ratio of resistor 64 and resistor 20 is chosen to first-order cancel the temperature variation of the output voltage. The total current consumption for the generator 90 is about $(2+\alpha)I2=(2+\alpha)V_T ln(n)/(1+\alpha)R_{20}$. In comparison, the band-gap reference voltage generator shown in FIG. 6B has a total current consumption of $3\eta V_T ln(n)/R_{20}$. Thus, the current consumption of generator 90 is $(2+\alpha)/(3*(1+\alpha)*\eta)$ times the current consumption of generator in FIG. 6B and this factor tends to $1/(3*\eta)$ for large values of $\alpha$.

Figure 8:
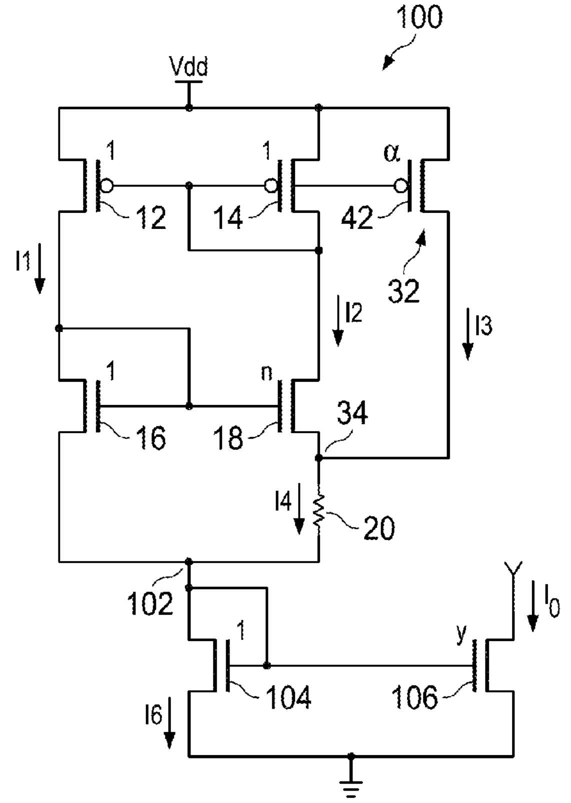
FIG. 8 is a circuit diagram of a PTAT current generator.

Reference is now made to FIG. 8 which is a circuit diagram of a PTAT current generator 100. Like reference numbers refer to like or similar parts. In the generator 100, the second end of the resistor 20 and the source terminal of the transistor 16 are coupled to a common node 102. An NMOS transistor 104 has its source-drain circuit coupled between the low reference supply node (for example, ground) and the common node 102. An NMOS transistor 106 is coupled to NMOS transistor 104 in a current mirror configuration (with a ratioing of 1:y). The source terminals of the NMOS transistors 104 and 106 are coupled to the low reference supply node, while the control terminal (gate) of NMOS transistor 104 is coupled to its drain terminal at the common node 102 and to the control terminal (gate) of NMOS transistor 106. The NMOS transistor 104 is a bottom current source for the NMOS transistors 16 and 18 and sources a current I6 which is equal to the sum of the currents I1, I2 and I3 (i.e., I6=I1+I2+I3=2*I2+I3). The NMOS transistor 106, in the current mirror arrangement with NMOS transistor 104, produces an output current $I_o$. The output current $I_o=y(2+\alpha)I2$. This is advantageous as it relaxes the current mirror ratioing factor. For example, in comparison to the generator of FIG. 3, for the same amount of output current $I_o$ in both circuits, the mirror ratioing factor y is $x/(2+\alpha)$. As before in FIG. 3, the two NMOS transistors 16 and 18 in generator 100 are operated in the sub-threshold region such that the delta voltage across the resistor 20 equals $\eta V_T ln(n)$. Thus, the current $I1=I2=\eta V_T ln(n)/(1+\alpha)R_{20}$.

A number of advantages accrue from use of the generators of FIGS. 2-8. For a similar area and mismatch, the PTAT current generators of FIGS. 3-4 and 8 exhibit a reduced current consumption in comparison to the generator of FIG. 1 by a factor of about two and the band-gap generators of FIGS. 5, 6A and 7 exhibit a reduced current consumption in comparison to conventional band-gap circuits by a factor of three. For a similar current and mismatch, the area occupied by the resistor in the PTAT current generators of FIGS. 3-4 and 8 is about one-half the area occupied by the resistor in the generator of FIG. 1. Because the area occupied by the generator circuit is dominated by the area occupied by the resistor, the PTAT current generators of FIGS. 3-4 and 8 will have significantly reduced occupied areas (one half as large) in comparison to the generator of FIG. 1. As compared to a conventional band-gap reference generator, the band-gap generators of FIGS. 5 and 6A (with current consumption reduced by a factor of about three) can instead be designed to have a same current consumption in a smaller occupied area.

It will be understood that the resistor 20 can be implemented in any known way including switched capacitor, switched resistor or MOS transistor in triode operation.

The generators described herein operate with a negative feedback based current re-use that effectively reduces branch current. A pseudo resistance multiplier is created to reduce branch current by injecting an additional up-scaled mirror current in the resistor of the PTAT generator circuit.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

What is claimed is:

1. A reference generator circuit, comprising:

a PTAT circuit including a first transistor coupled in series with a first resistive element at a first node, said first transistor configured to pass a first current to said first node;

a current source configured to source a second current to said first node;

a diode circuit connected in series with a second resistive element and coupled between the first node and an output of the current source and configured to pass the second current; and wherein the resistive element passes a third current equal to a sum of the first and second currents.

2. The circuit of claim 1, wherein the first resistive element is a resistor.

3. The circuit of claim 1, wherein the second current is a scaled mirror of the first current.

4. The circuit of claim 3, wherein the first current is sourced by a second transistor coupled in series with the first transistor, and the second current is sourced by a mirroring transistor coupled to the second transistor.

5. The circuit of claim 3, wherein the second and third transistors are coupled to a reference supply node.

6. The circuit of claim 5, wherein the reference supply node is a positive supply node.

7. The circuit of claim 3, wherein the second and third transistors are coupled to a second node and further comprising a seventh transistor coupled between a reference supply node and the second node.

8. The circuit of claim 7, further comprising an eighth transistor coupled to the seventh transistor in a current mirror configuration, said eighth transistor comprising said current source configured to source the second current.

9. The circuit of claim 3 further comprising a ninth transistor coupled to the second and third transistors in a current mirror configuration, said ninth transistor comprising said current source configured to pass the second current.

10. The circuit of claim 1, wherein the second current is derived from the first current.

11. The circuit of claim 1, wherein the PTAT circuit comprises a second transistor and a third transistor configured as a current mirror, the second transistor configured to source the first current to the first transistor, and the third transistor configured to source a fourth current.

12. The circuit of claim 11, wherein the first and fourth currents are equal.

13. The circuit of claim 11, wherein the PTAT circuit further comprises a fourth transistor, said fourth transistor configured to pass the fourth current, said fourth transistor having a control terminal coupled to a control terminal of the first transistor.

14. The circuit of claim 13, wherein the first through fourth transistors are MOS transistors.

15. The circuit of claim 13, further comprising a fifth transistor coupled between the fourth transistor and a reference supply node, and a sixth transistor coupled between the first resistive element and said reference supply node, said fifth transistor having a control terminal coupled to a control terminal of the sixth transistor.

16. The circuit of claim 15, wherein the fifth and sixth transistors are bi-polar transistors.

17. The circuit of claim 13, further comprising a seventh transistor and an eighth transistor configured as a current mirror, said seventh transistor configured to source a fifth current which is a sum of the third current and fourth current, said eighth transistor comprising said current source configured to source an output current.

18. The circuit of claim 11, wherein the second current is a scaled mirror of a fifth current which is a sum of the first current and fourth current.

19. The circuit of claim 18, further comprising a ninth transistor and a tenth transistor configured as a current mirror, said ninth transistor configured to source the fifth current, said tenth transistor comprising said current source configured to source the second current.

20. The circuit of claim 1, wherein the resistive element is coupled between the first node and a reference supply node.

21. The circuit of claim 20, wherein the reference supply node is a ground reference node.

22. A reference generator circuit, comprising:

a PTAT circuit including a first transistor, a second transistor, and a first resistive element, wherein the first and second transistors have control terminals coupled to each other, the first resistive element having a first end coupled to a conduction terminal of the second transistor and a second end coupled to a reference supply node;

a current source circuit configured to source additional current into the first end of the first resistive element; and a diode circuit connected in series with a second resistive element and coupled between the output of the current source circuit and the first end of the first resistive element.

23. The circuit of claim 22, wherein the PTAT circuit further includes a third transistor and a fourth transistor, wherein the third and fourth transistors have control terminals coupled to each other, wherein the third transistor sources a first current to the first transistor, wherein the fourth transistor sources a second current to the second transistor.

24. The circuit of claim 23, wherein said additional current is a scaled mirror of the first and second currents.

25. The circuit of claim 23, further comprising an output transistor coupled in a mirror configuration with the third and fourth transistors and configured to source an output current.

26. The circuit of claim 23, further comprising a fifth transistor coupled to the second transistor and resistor and configured to source a third current equal to a sum of the first current, second current and additional current.

27. The circuit of claim 26, further comprising an output transistor coupled in a mirror configuration with the fifth transistor and configured to source an output current.

28. The circuit of claim 23, further comprising a sixth transistor configured to source a fourth current equal to a sum of the first and second currents, and wherein said additional current is a scaled mirror of the fourth current.

29. The circuit of claim 28, further comprising an output transistor coupled in a mirror configuration with the third and fourth transistors and configured to source an output current.

* * * * *